Nov. 15, 1938.  E. V. BRISCOE  2,136,911
DITCH DIGGER AND CLEANER
Filed Jan. 7, 1937  4 Sheets-Sheet 2
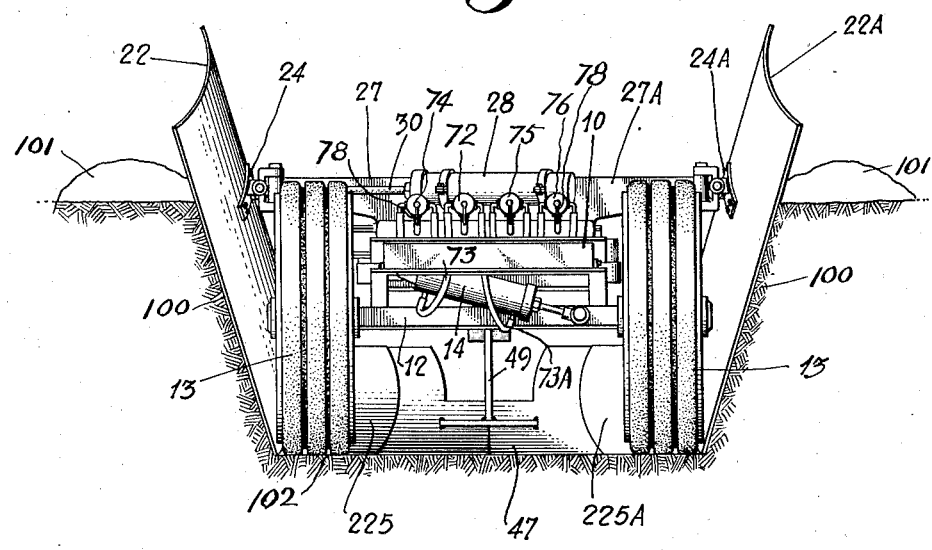
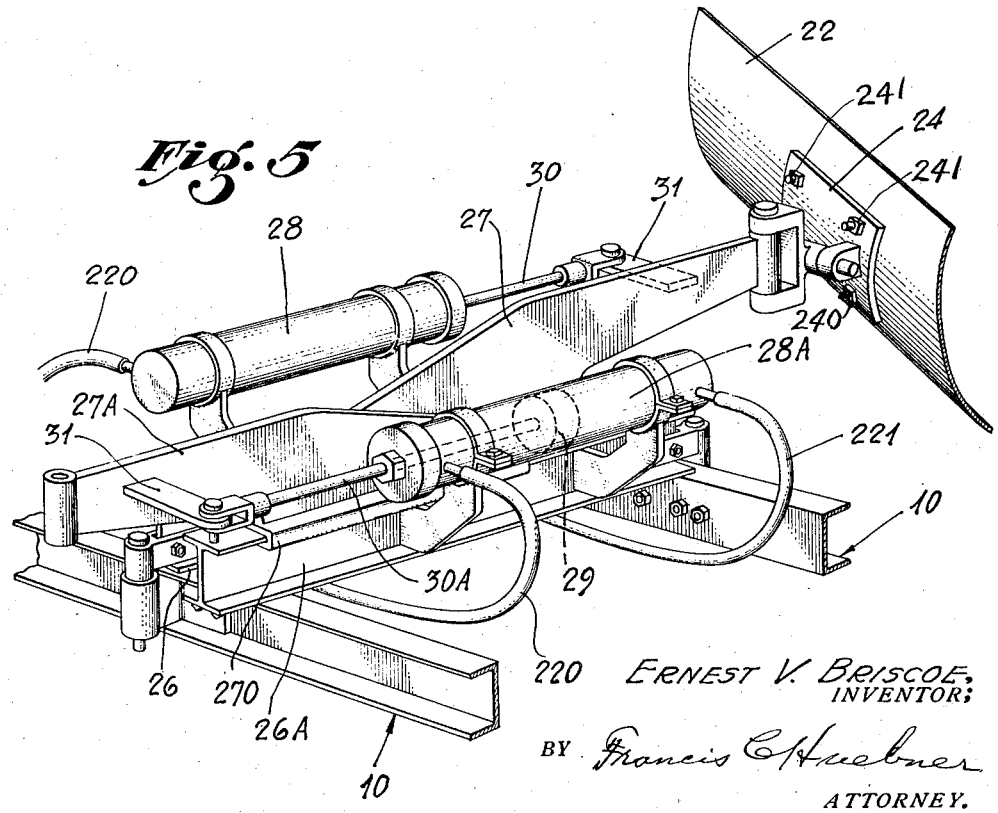
ERNEST V. BRISCOE,
INVENTOR;
BY Francis C. Huebner
ATTORNEY.

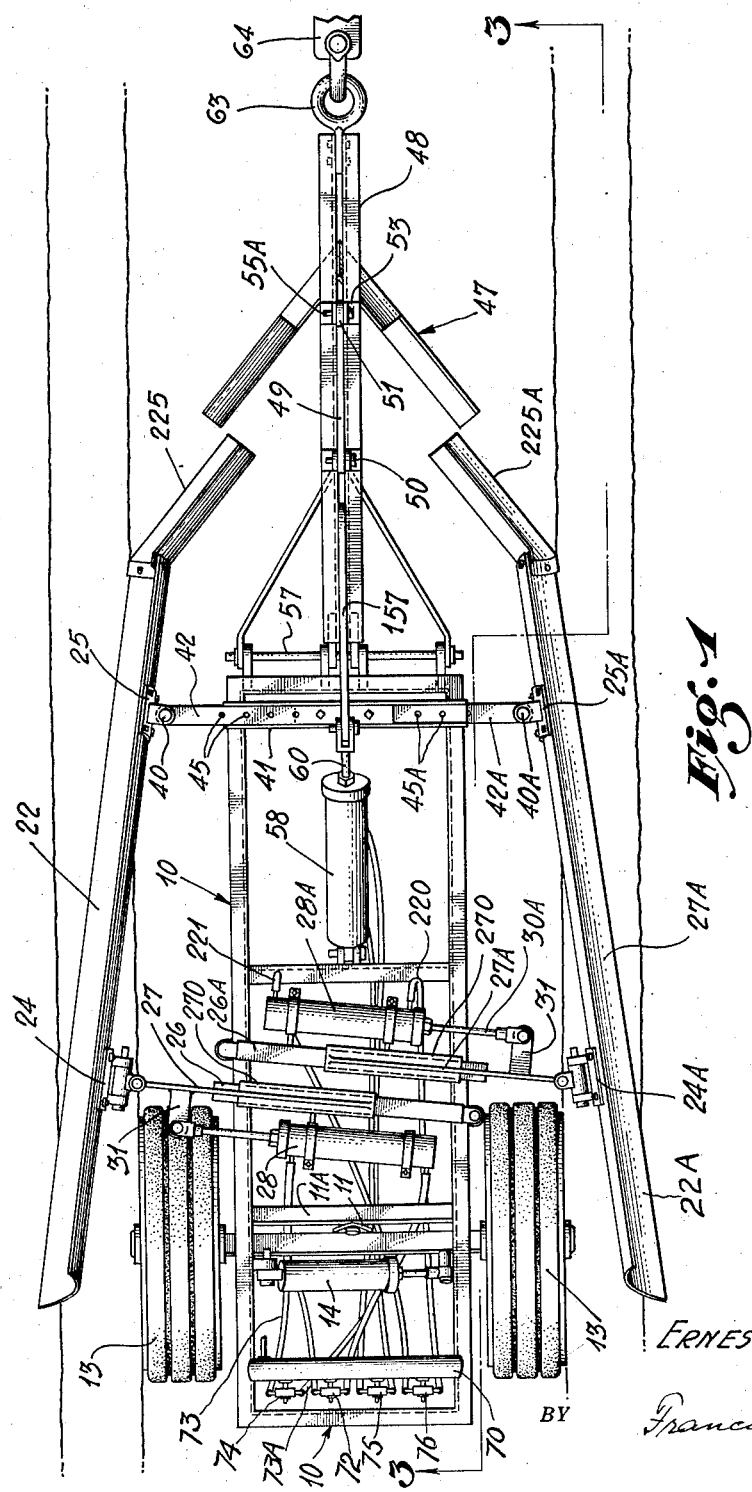

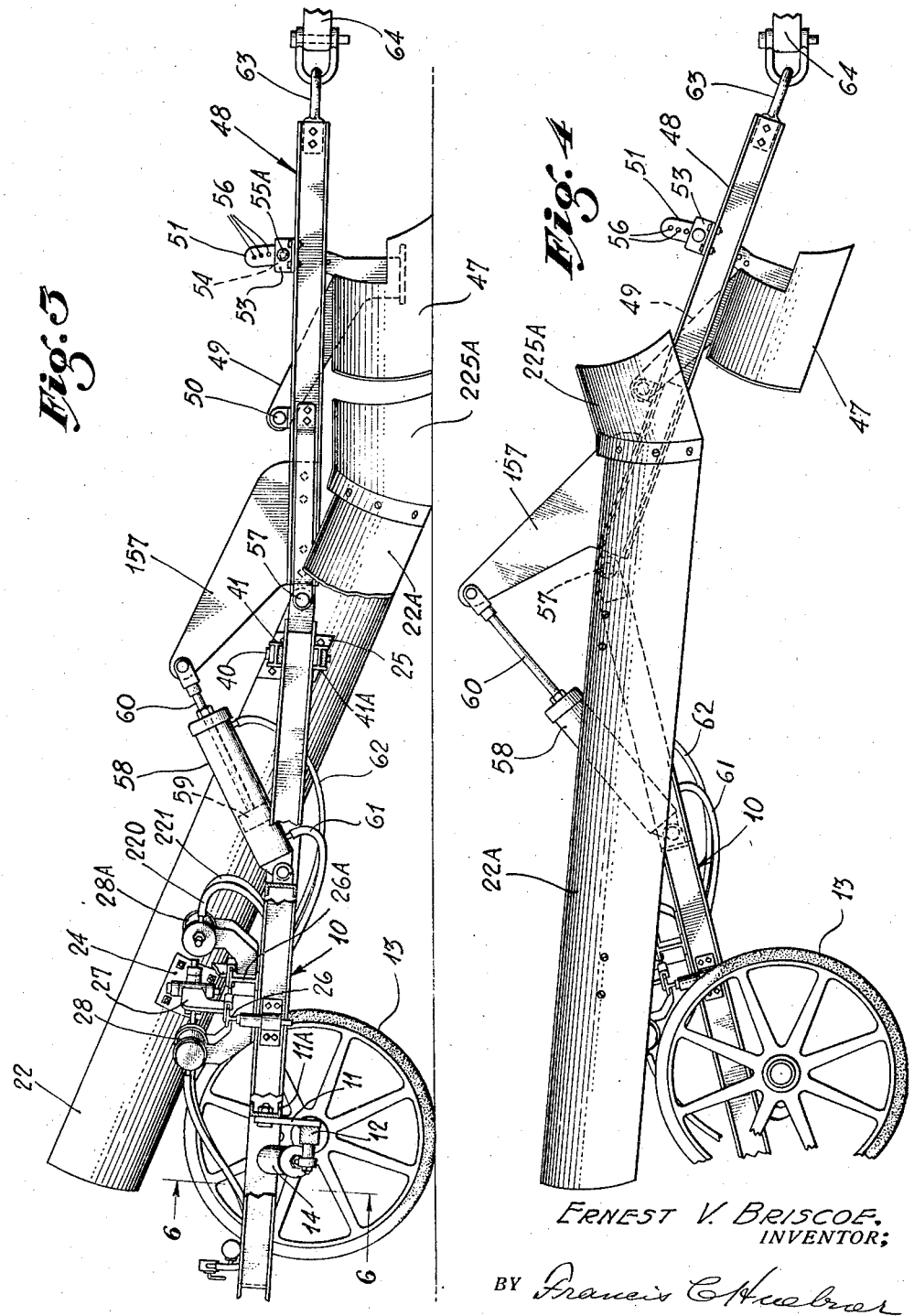

Nov. 15, 1938. E. V. BRISCOE 2,136,911
DITCH DIGGER AND CLEANER
Filed Jan. 7, 1937 4 Sheets-Sheet 4

ERNEST V. BRISCOE,
INVENTOR;

BY Francis C. Huebner,
ATTORNEY.

Patented Nov. 15, 1938

2,136,911

UNITED STATES PATENT OFFICE 2,136,911

DITCH DIGGER AND CLEANER

Ernest V. Briscoe, Kerman, Calif.

Application January 7, 1937, Serial No. 119,431

10 Claims. (Cl. 37—98)

My invention relates to a ditch digger and cleaner. It is known that in sections of the country in which irrigation is used, many miles of ditches are required to convey the irrigating water, that during portions of the year the ditches are dry, in that no stream of water is passing therethrough, and weeds and grass grow in the bottom of and on the banks of the ditch. If the weeds and grass are not cleaned out annually, the seeds from the weeds and grass pollute the lands being irrigated the following season, and they also hinder the water from flowing freely therethrough. It therefore becomes necessary annually to scrape the bottom and sides of these irrigation ditches and to deposit the scrapings at a place where they cannot be carried to the irrigated fields when the water flows in the ditch again. Heretofore the work of cleaning ditches has been done with ordinary earth working tools, such as ordinary dirt scrapers, shovels, plows and similar tools.

An object of my invention is the construction of a tool which will clean the sides and bottom of the ditch in one operation. Another object is the adjustment of the scraper blades on either side, so that the two sides of the ditch of varying widths can be cleaned. Another object is an adjustment of the frame carrying the blades so that the blades can be lifted to an approximately horizontal plane above the bottom of the ditch, to permit the tool to be easily removed from the ditch. Another object is a device which permits the frame carrying the scraper blades to be easily adjusted to a parallel plane to the plane of the axle, or on a plane at an angle to the plane of the axle.

Another object is to keep the frame carrying the scraper blades on an approximate horizontal plane whether the ditch bottom is level or not, it being observed that after running water in a ditch for a short period the bottom of the ditch is usually irregular and frequently cut deeper on one side than the other.

Another object is to even the banks of the ditch to an approximate plane while being cleaned.

Another object is to scrape the top soil, grass and weeds from the sides of the ditch and to remove the cut off portion to the top of the ditch bank and deposit it there.

Another object is to dig ditches.

These and other objects hereinafter set forth are accomplished by means of the device hereinafter described and illustrated on the accompanying drawings in which Fig. 1 shows a top plan view of my device.

Fig. 2 is a rear elevation of my ditch digger and cleaner.

Fig. 3 is a side elevation of the device as shown in Fig. 1 as viewed along the line 3—3 in Fig. 1, in working position.

Fig. 4 is a side elevation with the cutting blades raised for transportation of the tool, and not in working position.

Fig. 5 is a fractional view of the device showing hydraulic means for adjusting the scraper blades.

Figure 6:
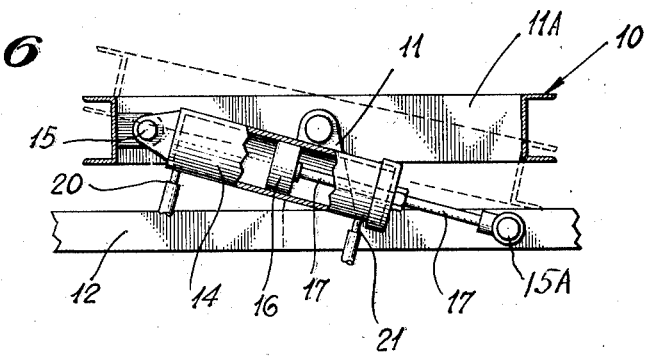
Fig. 6 is a fractional view of the rear axle and the rear end of the frame, having parts cut away to show the piston within the cylinder, and means for angling the frame with relation to the rear axle.

Referring to the drawings, I have constructed a frame 10 which is preferably rectangular in form. I have also provided a carriage for the frame consisting of an axle 12, carrying wheels 13. Referring more specifically to Figs. 2 and 6, at the approximate lateral center of the axle is an upright post 11, to which post a cross member 11A of the frame is pivotally attached. This pivotal connection permits the frame to be rocked so that cross member 11A can be positioned parallel with the axle carrying it, or it can be positioned at an angle thereto. Inasmuch as cross member 11A is a part of the frame and rigidly attached to the frame, when cross member 11A is tilted, or positioned on a parallel plane with the axle, the entire frame and the attachments thereto are likewise tilted or positioned on parallel planes. To control the angle of such adjustment between the axle and the frame, I have provided a closed cylinder 14 which is pivotally attached at one end by pivot 15 to cross member 11A near one end thereof. A piston 16 adapted to slide within the cylinder has piston rod 17 attached thereto. The piston rod is pivotally attached with pivot 15A to the axle between the lineal center of the axle and end opposite the end of the cross bar member to which the cylinder is attached. It will be noted that as shown in Fig. 6 of the drawings, the movement of the piston within the cylinder will tilt the frame relative to the axle one way or the other. Or, the frame can be moved so it will be on a parallel plane with the plane of the axle. The object of this adjustment is to compensate for the varying angle between the plane of the bottom of the ditch bottom, and the sides of the ditches, which differences frequently prevail in ditches in which the water has been running for a season. The movement of the piston within the cylinder is accomplished with hydraulic pressure, oil being the preferable medium, the oil passing under pressure into either end of the cylinder through pipes 20 and 21.

It is noted that control of the flow of the oil for this purpose can be had while the carriage is moving, or at rest, by means of a valve 72, and leads 73 and 73A from a reservoir of oil to the cylinder.

Scraper blades 22 and 22A are located on either side of the frame. The function of said blades is to shave off the surface of the sides of the ditch, and to convey such scrapings to the top of the ditch bank. The scraper blades are curved transversely as shown in the drawings. Each blade is constructed so that the soil when cut from the sides of the banks will follow such curvature and roll over and upward. This rolling movement carries the soil and refuse cut from the ditch bank to the rear, and upper end of the blade, where it is deposited on the ditch bank.

Figure 7:
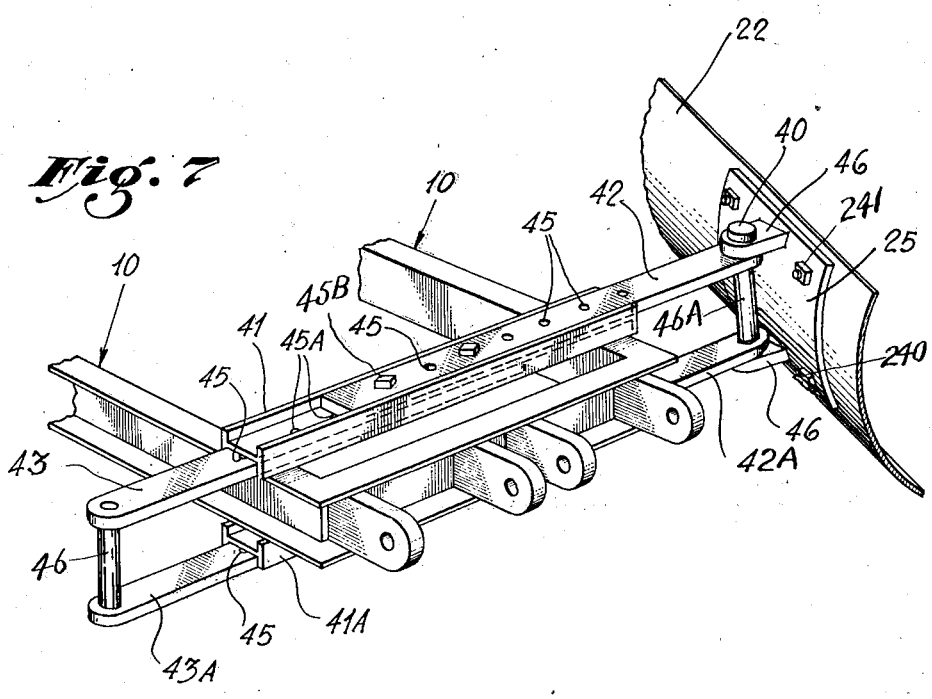
Fig. 7 is a fractional view of the frame showing slideways adapted to adjust the front ends of the scraper blades.

The front ends of the blades are supported in the following manner. I beams 41 and 41A are attached to the front end of the frame, and transversely therewith, one of said beams being placed on the top of the frame, and one directly underneath said frame. Each I beam, having two channels, forms two slideways as shown in Fig. 7. Sliding beams 42, 42A, 43 and 43A are adapted to slide within the slideways. As shown in the drawings, the pair consisting of beams 42 and 42A use the channels on the upper side of the I beams, and the pair designated 43 and 43A use the underside channels. This order can be reversed if desired. Holes 45A at the approximate lineal center of the I beam, and holes 45 through the sliding beams are adapted to receive a bolt 45B to fasten the sliding beams and the I beam together. The plurality of holes 45 and 45A are used to permit adjustments as to the combined lengths of the sliding beams, and necessarily, to permit adjustment as to the distance the front ends of cooperating pairs of scraper blades shall be spaced apart. The sliding beams of each pair are attached together at the outer ends by tubular members 46 and 46A, said tubular members being attached at right angles to the sliding beams. These tubular members are adapted as bearings for bolts 40 and 40A to pivotally connect brackets 25 and 25A to the sliding beams. Brackets 25 and 25A are connected near the front ends of the scraper blades. It is noted that the adjustment of the length of the sliding beams is intended to adjust the space between the front ends of the scraper blades 22 and 22A, so they can be adjusted to work in ditches having bottoms of different widths.

Scraper blades 22 and 22A are shown as having attached thereto near the front ends brackets 25 and 25A, which have heretofore been referred to, and near the rear ends brackets 24 and 24A. The function of brackets 25 and 25A have already been shown. Each of these brackets is hingedly connected at the lower edge with a hinge 240, and fastened with bolts 241 near the opposite edge. The hinges permit the blade to be moved thereon to vary the tilt of the cutting edge, and such adjustment is held rigid by means of a selective thickness of washers, not shown, being carried by bolt 241 between the bracket and the scraper blade. It is noted that when the adjustment desired is secured, bolt 241 and hinge 240 holds the bracket in a rigid relation with the blade when the nut on the bolt is tightened.

I beams 26 and 26A are pivotally attached at either end to opposite sides of the frame nearer to the back of the frame than I beams 41 and 41A. I beams 26 and 26A are positioned vertically so the upper flanges form a slideway for sliding supports 27 and 27A. To adapt the sliding supports to slide on the I beams and to be constantly held in an upright relation thereto, the bottom of the sliding supports has a channel 270 which fits over the double flange of the I beam. The width of the flanges of the channel 270 is restricted by bending the channel sides inwardly so that the flanges on the I beam are grasped by the bent sides.

Cylinders 28 and 28A are attached to I beams 26 and 26A. These cylinders are closed at either end. Pistons 29 are moveable therein, and each piston has a piston rod 30 or 30A which is attached to an arm 31, which arms are attached to sliding support 27 or 27A. It will be noted that by the movement of piston 29 back and forth, the scraper blades 22 and 22A will be moved toward, or away from the frame 10 on pivots 40 and 40A. To accomplish this movement hydraulic pressure is used in either end of the cylinder, oil being the fluid preferred, the oil pressure being introduced at one end through pipe 220 and at the other end by pipe 221, said pipes being connected with a reservoir 70 of oil under compression.

It is noted that by this construction the movements or adjustments of the two scraper blades on either side of the tool function independently of each other. An object in having the scraper blades adjusted separately is that frequently on one of the ditch banks there is an obstruction, such as a tree, a rock or masonry, or other object which should not be disturbed, and the scraper blade on such side can be withdrawn from engagement with the earth while the device is in motion, and after passing the obstruction the blade can again be positioned for work.

To clean the bottom of the ditch I have provided a lister plow 47 which is attached to tongue 48. The bottom of said lister plow is approximately V shaped as shown in Figs. 1, 3 and 4, and the blades forming said plow are curved like the mouldboards of lister plows in common use. The lister plow is attached to the tongue by means of an arm 49 pivotally attached to a lug 50, which lug is attached to the tongue. The depth of the cut of the lister plow is regulated by post 51 attached to said plow, and projecting upwards past the tongue and past a block 53 attached to the tongue. Block 53 has a hole 54 therein which hole registers with either one of a plurality of holes 56 in the upper end portion of post 51. A pin 55A is passed through holes 54 and 56 which register, to anchor the lister plow to the tongue at the depth desired.

Tongue 48 is pivotally attached to the frame 10 by pivot 57. A closed cylinder 58 is pivotally attached at one end to frame 10, said pivot permitting the cylinder to swing on a plane parallel with the plane of the movement of the tongue on pivot 57. A piston 59 adapted to slide within the cylinder is attached to piston rod 60, which piston rod is pivoted to brace 157. Leads 61 and 62 are adapted to conduct hydraulic pressure to the two ends of the cylinder. These leads are connected with the reservoir of oil 70. When hydraulic pressure is applied within the cylinder and the piston rod is moved outwardly, the frame and tongue form an angular relation, and as the front end 63 of the tongue is anchored to the tractor hitch 64 at a fixed level, the front end of the frame carrying the scraper is elevated, thus raising the front end of the scraper blade from engagement with the earth. This adjustment is necessary when moving the device into the ditch, or out of the ditch, and to regulate the depth the front end of the blades will engage the earth. By reversing the pressure of oil in the cylinder, the tongue and frame can be positioned on a common plane, or at any selective angle.

It is noted that the hydraulic pressure to and from the several cylinders herein referred to is controlled by valves 72, 74, 75 and 76 as shown in Fig. 1. These can be positioned together for easy access by the operator, and can be operated by hand.

The front ends of scraper blades 22 and 22A have extensions 225 and 225A. These extensions are bent inwardly to approximate an angle with the center line of the tool corresponding to the angle of the lister plow blades with that same line. The object of these extensions is to have the front ends of the scraper blades catch the earth thrown aside by the lister plow.

The rear ends of the lister blades are preferably spaced further apart than the space between the front ends of the extensions to the scraper blades. This preferred arrangement is shown in Fig. 1. The extensions 225 are curved approximately like the curvature of the mouldboard of a plow so the earth engaged by them is thrown outwardly, and caught by the extensions of the scraper blades, and then carried by the scraper blades to the top of the ditch bank as hereinbefore more fully described.

It is also noted that by the use of hydraulic pressure in the several cylinders described for the purpose of moving and adjusting the frame, and the blades, that when the adjustment desired is obtained the oil within the cylinders hold the frame or blades in such adjustment. This is accomplished by closing the circulation of the oil therein by manipulating either of valves 72, 74, 75 or 76. Either of these valves has a handle 78 which can be manipulated by hand. This handle is shown in Fig. 2. Also in Fig. 2 is shown a representation of the ditch being cleaned, the sides being represented as 100, the bottom 102, and the bank of earth and weeds cut from the bottom and sides of the bank as 101.

Having described my invention I claim as new and ask for Letters Patent:

1. In a device for cleaning ditches having a carriage consisting of an axle and wheels at either end thereof, a frame mounted on said carriage, scraper blades carried on either side of the frame means for adjusting either end of the scraper blades selective distances from said frame, a tongue pivotally connected to the frame, said pivotal connection of the tongue being adapted to permit a vertical movement of the tongue and frame relative to each other, means for anchoring the end of the tongue opposite to the pivotal connection, and means for raising the front end of the frame and the rear end of the tongue consisting of a post or brace attached to the tongue, a closed cylinder pivotally attached to the frame, a piston within the cylinder, a piston rod attached at one end to the piston, and at the other end pivotally attached to the post, and means for conducting fluid pressure at will to either end of the closed cylinder.

2. A device described in claim 1 having means whereby the admission of the fluid pressure at either end of the cylinder is controlled by hand means.

3. In a device for cleaning ditches having a carriage consisting of an axle and wheels at either end of said axle, a frame mounted on the carriage, a scraper blade carried on each side of the frame, means for adjusting either end of the scraper blades selective distances apart and from the frame, a tongue pivotally attached at one end to the frame, the pivotal connection of said tongue being adapted to permit the tongue and the frame to be moved vertically and at selective angles relative to each other, means for anchoring the free end of the tongue to traction means, hydraulic means for angling the tongue with the frame on the vertical plane, said tongue carrying a lister on the under side thereof, the vertical movement of the tongue being adapted to raise and lower the said lister with relation to the earth.

4. A device described in claim 3 having the outside cutting blades of the lister extending slightly beyond the front ends of the scraper blades.

5. In a device for cleaning ditches having a carriage consisting of an axle and wheels mounted on either end thereof, a frame mounted on said carriage, scraper blades carried on either side of the frame, means for adjusting either end of the scraper blades selective distances from said frame, a tongue pivotally connected to the frame, said pivotal connection of the tongue being adapted to permit a vertical movement of the tongue and frame, and adapted to form an angular relation of the tongue and frame relative to each other, means for anchoring the free end of the tongue to traction means, and hydraulic means for raising the front end of the frame and the rear end of the tongue, a lister carried by the tongue on the under side thereof, the lister having earth turning and cutting members positioned in angular relation to each other, the portion of the lister where the cutting and earth turning members are farthest apart being positioned toward the rear, the scraper blades having bent in portions at the front ends thereof, said bent in portions being adapted to engage the earth which has been cut and turned over by the lister.

6. A device described in claim 5 having the bent in portions of the scraper blades at the front ends of the scraper blades, adapted to roll over the earth cut by the lister and by the scraper blade, and to move said earth away from the blades, said scraper blades and the front ends thereof being curved transversely for that purpose.

7. In a device for making and cleaning ditches, said device having a carriage consisting of an axle with wheels mounted on either end thereof, a frame mounted on said carriage, a tongue attached to the frame at one end and means at the other end adapting said tongue to be attached to traction means, scraper blades carried on either side of the frame, means for adjusting either end of the scraper blades selective distances from the frame, the means for adjusting the rear end of either scraper blade from the frame consisting of a beam pivotally attached at one end to the frame, a closed cylinder attached to the beam, a piston within the cylinder, a piston rod attached at one end to the piston and the other end of the piston rod being connected with means attached to the scraper blade, and means for conducting fluid pressure to either end of the cylinder.

8. In a device for making and cleaning ditches, said device having a carriage consisting of an axle with wheels mounted on either end thereof, a frame mounted on said carriage, a tongue attached to the frame, said tongue being adapted at the loose end to be attached to tractor means, scraper blades carried on either side of the frame, said scraper blades being pivotally attached to supports near the front ends of the scraper blades, said supports being adjustable as to length and adapted to be attached to the frame in selective positions, said pivotal connections being adapted to permit the rear ends of the scraper blades to be moved toward and from the frame, means for adjusting the rear ends of the scraper blades selective distances from the frame consisting of beams pivotally attached at one end to the frame, said beams being adapted to be slideways, sliding members adapted to slide on said slideways, and adapted to support the rear ends of the scraper blades, hydraulic means attached to the pivotally connected beams adapted to move the sliding member back and forth on the beam.

9. A device described in claim 8 having independent means for moving the blades on either side of the frame.

10. In a device for cleaning ditches having a carriage consisting of an axle and wheels mounted on either end thereof, a frame mounted on said carriage, means for attaching the frame to a device having motive power, a scraper blade on each side of the frame, said scraper blades being pivotally attached near the front end thereof to sliding members adapted to be attached to the frame at selective positions, means for adjustably attaching the scraper blade to the frame to the rear of the pivotal connection above claimed consisting of a beam adapted as a slideway pivotaly attached near one end to the frame on the side opposite to the side of the frame carrying the scraper blade, a support adapted to slide on said slideway, and assembled therewith, pivotally attached to the scraper blade between the front pivotal connection and the rear end of the scraper blade, means for moving said sliding support and the scraper blade pivotally attached thereto, and for holding the scraper blade in such selective position consisting of a closed cylinder attached to the beam adapted as a slideway, a piston within the cylinder, a piston rod attached at one end to the piston and the other end attached to the sliding support, and means for conducting fluid pressure to either end of the cylinder.

ERNEST V. BRISCOE.